United States Patent [19]

Sequeira et al.

[11] Patent Number: 4,681,136
[45] Date of Patent: Jul. 21, 1987

[54] GAS FLOW PULSATION DAMPENER AND PRESSURE DIFFERENTIAL CONTROL

[76] Inventors: Richard J. Sequeira, 941 Karen Dr.; Frank R. Valadez, 1011 Phillips Rd., both of Yuba City, Calif. 95991

[21] Appl. No.: 827,053

[22] Filed: Feb. 7, 1986

[51] Int. Cl.[4] ............................................. F16K 31/365
[52] U.S. Cl. ...................................... 137/494; 251/54; 251/57; 92/134
[58] Field of Search ................. 137/514.7, 494; 251/5, 251/54, 57, 61.1; 92/134, 143

[56] References Cited

U.S. PATENT DOCUMENTS

| | | | |
|---|---|---|---|
| 2,573,864 | 11/1981 | Moran | 251/5 X |
| 2,674,267 | 4/1954 | McCarvell . | |
| 2,756,771 | 7/1956 | Spencer . | |
| 3,064,675 | 11/1962 | Johnson et al. | 251/54 X |
| 3,272,470 | 9/1966 | Bryant . | |
| 3,487,855 | 1/1970 | Lautenberger . | |
| 3,669,142 | 6/1972 | Gerbic | 251/5 X |
| 3,669,151 | 6/1972 | Fleming . | |
| 3,942,551 | 3/1976 | Schuller et al. | 251/54 X |
| 4,096,785 | 6/1978 | Wirges | 92/134 X |
| 4,190,071 | 2/1980 | Dean et al. . | |
| 4,287,911 | 9/1981 | Houdeshell | 137/514.7 X |
| 4,313,461 | 2/1982 | Brumm | 251/57 X |

Primary Examiner—Martin P. Schwadron
Assistant Examiner—Stephen M. Hepperle
Attorney, Agent, or Firm—Harvey B. Jacobson

[57] ABSTRACT

A device with use in combination with an expansible sleeve-type gas flow control valve in a production gas supply between a compressor and a delivery line provides pressure differential control as between the valve inlet and the valve outlet by relating hydraulic control pressure around the resilient sleeve of the valve to valve outlet gas flow pressure through a primary piston and cylinder assembly. The primary piston is linked to a secondary piston in a secondary cylinder of smaller diameter which in turn communicates with an accumulator for dampening pulsations in the valve.

5 Claims, 3 Drawing Figures

GAS FLOW PULSATION DAMPENER AND PRESSURE DIFFERENTIAL CONTROL

BACKGROUND OF THE INVENTION

This invention relates to a pressure differential and pulsation dampener control device for an expansible sleeve-type gas flow control valve.

In natural gas well production, for example, expansible sleeve-type flow control valves are commonly used to control production flow from a compressor to a delivery pipe line, with production from a well being measured on a daily basis to provide a record of the production level. However, gas compressors have an inherent pulsation problem which may cause inaccuracies in the devices used to measure production. Attempts have been made to alleviate this problem by using expansible sleeve-type flow control valves to create back pressure on the compressor and reduce pulsation so that an accurate production measurement can be made.

A typical sleeve-type flow control valve may, for example, comprise a body having inlet and outlet passages between which is positioned a circular barrier member with a space around it within the housing providing a flow path through the housing around the barrier member. A cylindrical sleeve of resilient material fits snugly over the barrier member and is sealed at its opposite ends within the housing. The internal diameter of the sleeve is normally slightly smaller than that of the barrier member so that it is stretched over the barrier member to provide a snug sealing fit under the force of the tensioned resilient material in the absence of fluid pressure acting against it. The barrier member prevents fluid flow directly through the valve and normally the sleeve prevents flow around the barrier member. However, at sufficient inlet pressure, the fluid expands the sleeve outwardly and flows between the barrier and the sleeve to the outlet flow passage.

In normal operation, a control pressure is introduced into the housing around the resilient sleeve to oppose its outward expansion and maintain the sleeve in sealed relationship as long as the control pressure is as great or greater than the upstream pressure. Then, in the event that the control pressure, in conjunction with the tension of the expansible sleeve is overcome, the sleeve expands outwardly to permit flow through the valve body. It is in the control of the pressure around the expansible sleeve where attempts have been made to maintain a consistent back pressure and reduce pulsation without adversely affecting production.

The invention provides a control device which maintains a substantially constant upstream and downstream pressure differential across a sleeve-type flow control valve while at the same time minimizing pulsations.

SUMMARY OF THE INVENTION

In accordance with the invention, a pressure differential and pulsation dampening control device for use in conjunction with an expansible sleeve-type gas flow control valve as described comprises a primary piston and cylinder assembly having one end of the cylinder filled with hydraulic fluid for communication with the exterior of a resilient sleeve of the valve for supplying control pressure to the sleeve, the other end of the primary cylinder having a port for connection in gas flow communicaion with the outlet end of the valve so as to relate the control pressure proportionately to the outlet pressure of the valve thereby controlling differential pressure as between the valve inlet and valve outlet. A piston of the primary piston and cylinder assembly conveniently may have a like surface area as the outer surface area of the sleeve.

Further, in accordance with the invention, the primary piston may be mechanically linked by a piston rod to a smaller diameter secondary piston in a secondary cylinder. The rod end of the secondary cylinder may be open to atmosphere while the other end of the secondary cylinder is filled with hydraulic fluid and communicates with a bladder-type accumulator charged with compressed gas. This arrangement is effective for dampening pulsations in the control valve.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
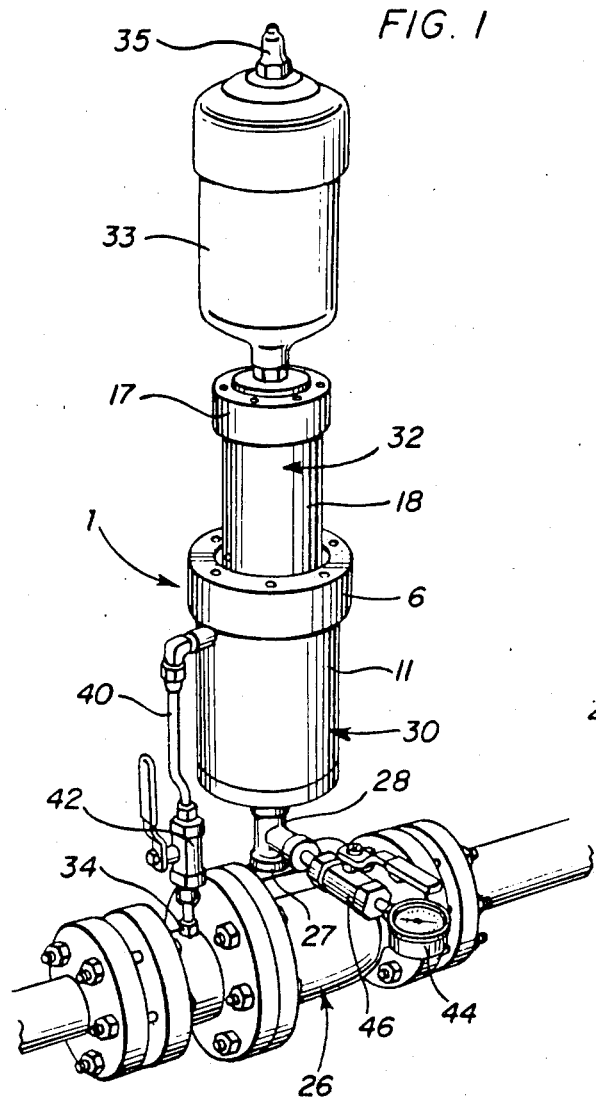
FIG. 1 is a perspective view of a pressure differential and pulsation dampening control device in accordance with the invention in combination with an expansible sleeve-type flow control valve in a gas line delivery from a compressor.
Figure 3:
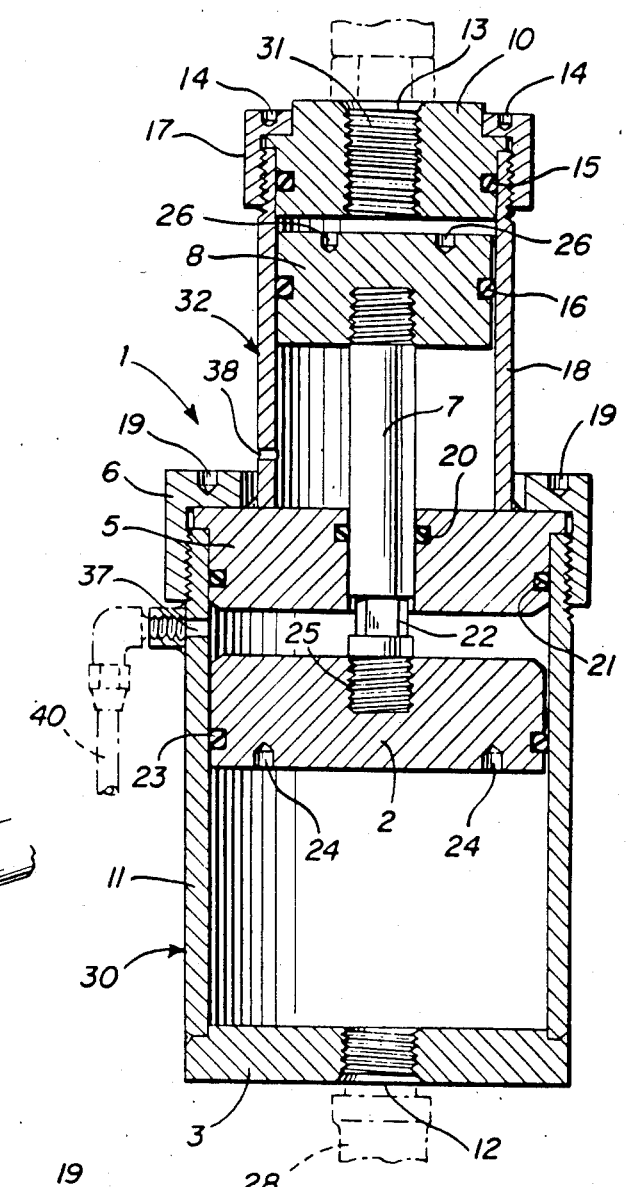
FIG. 3 is a longitudinal sectional view on line 3—3 of FIG. 2.
Figure 2:
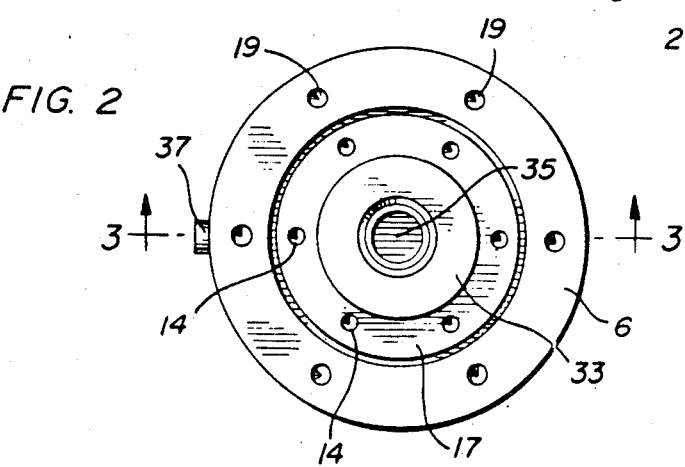
FIG. 2 is a plan view of the apparatus.

A control device 1 in accordance with the invention is attached to a sleeve-type flow control valve 26 of a known type as previously described, and which may, for example, be a Grove Flex-Flow size 2 valve, at a port 27 located on top of the valve. Atop control device 1 is a bladder-type accumulator 33 which is attached to a top port 31 of the control device.

Control device 1 consists of primary and secondary cylinders 30 and 32 which contain respective primary and secondary pistons 2 and 8 interconnected by an attachment rod 7. Piston 2 has approximately the same surface area as the outside surface area of an expansible sleeve (not shown) in the sleeve-type flow control valve 26. Under piston 2, the bottom cylinder 30 contains hydraulic fluid. This fluid is communicated to the sleeve-type flow control valve through an interconnecting port 12 at the bottom of cylinder 30 and port 27, through a fitting 28, so that the fluid is allowed to surround the expansible sleeve of valve 26. On the top face of piston 2, a natural gas signal is sensed. This natural gas signal is received at a port 37 in the bottom cylinder and is generated at a downstream port 34 of valve 26. The natural gas signal on the top face of piston 2 loads the hydraulic fluid trapped beneath the piston and in turn creates control pressure around the resilient sleeve in valve 26. The greater the control pressure, the less flow is allowed through valve 26 and the lower the control press the more flow will be allowed through the valve. Since the outside surface area of the resilient sleeve in valve 26 and the bottom piston 2 of the control device have a fixed relationship, any change in downstream gas pressure P2 at port 34 will provide a proportional change in the metering of valve 26. Hence, a consistent pressure differential is maintain between upstream pressure P1 and downstream P2.

Port 34 may be connected to port 37 by tubing 40 which may include a manual shut-off 42 to allow for servicing or disconnection of the Gas Flow Pulsation Dampener. Fitting 28 may be connected with a pressure gauge 44 that may have a shut-off valve 46.

The top cylinder 32 of the control device is smaller in diameter than the bottom cylinder 30 and contains piston 8 which is interconnected to piston 2 by rod 7. The bottom face of piston 8 is vented to atmosphere through a vent hole 38 in the side of the top cylinder. The top of cylinder 32 contains trapped hydraulic fluid which communicates with bladder-type accumulator 33 through port 31 in the top cylinder. The accumulator 33 is pre-charged with compressed air by a valve 35 located on top of the accumulator. The compressed air charge of the accumulator creates a charge on the hydraulic fluid trapped above piston 8. Since piston 8 is interconnected to piston 2 by rod 7, any pulsation created in the valve 26 is transmitted through both pistons and absorbed by the accumulator. This gives the device an ability to act as a pulsation dampener. In addition to giving the device its dampening ability, the top cylinder 32 also increases the charge on the hydraulic fluid trapped beneath piston 2 and allows for adjustability of the control pressure on the resilient sleeve of valve 26.

In constructional detail, control device 1 may consist of a bottom barrel 11 with a blind end 3 piloted and welded in place. A number 8 O-ring boss sae port 12 is located on the blind end to provide connection with fitting 28. The bottom piston 2 is provided with a dynamic seal 23 which provides sealing between the fluid phase below the piston and the gaseous phase above the piston. The piston is also provided with dowel wrench holes 24 for easy assembly and disassembly. The piston 2 also has a female threaded blind hole 25 for the interconnecting rod. The interconnecting rod 7 is threaded at both ends and may have wrench flats 22 for easy assembly and disassembly. The bottom barrel has a head 5 secured to the barrel by a screw ring 6. The screw ring has dowel wrench holes 19 for assembly and disassembly. The head 5 is provided with a static head seal 21 and a dynamic rod seal 20. A top barrel 18 defining cylinder 32 is connected by a weld to the head 5 of the bottom barrel. Piston 8 has a dynamic seal 16 and dowel wrench holes 26. A head 10 containing a static seal 15 and a number 8 O-ring boss port 13 provides a connection with accumulator 33. A screw ring 17 with dowel wrench holes 14 secures head 10 to the top barrel 18.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an expansible sleeve-type gas flow control valve, a pressure differential control device comprising a primary piston and cylinder assembly having one end of the primary cylinder filled with hydraulic fluid and being in flow communication with the exterior of a resilient sleeve of the valve for supplying control pressure thereto, the other end of the primary cylinder being in gas flow communication with the outlet of the valve so as to relate the control pressure proportionately to the outlet pressure of the valve thereby controlling differential pressure as between the valve inlet and outlet, said primary piston being mechanically linked by a piston rod to a smaller diameter secondary piston in a secondary cylinder, the rod end of the secondary cylinder being ported to atmosphere and the other end of the secondary cylinder being filled with hydraulic fluid and in communcation with an accumulator so as to provide pulsation dampening of the valve.

2. A pressure differential and pulsation dampening control device for use in conjunction with an expansible sleeve-type gas flow control valve in which gas flow through the valve is dependent upon expansion of a resilient sleeve responsive to inlet pressure being in excess of a control pressure on the exterior of the sleeve, the device comprising a primary piston and cylinder assembly having one end of a primary cylinder adapted to be filled with hydraulic fluid and formed with a port for communicating with the exterior of the resilient sleeve to supply the control pressure, the other end of the primary cylinder having a further port for gas flow communication with the valve outlet so as to relate the control pressure proportionately to valve outlet pressure and control differential pressure as between the valve inlet and outlet, the primary piston being mechanically linked by a piston rod to a smaller-diameter secondary piston in a secondary cylinder, the rod end of the secondary cylinder being ported to atmosphere and the other end of the secondary cylinder being adapted to be filled with hydraulic fluid and formed with another port for communication with an accumulator to provide pulsation dampening of the valve.

3. The invention of claim 2 wherein said another port is in communication with a gas-charged bladder-type accumulator.

4. A pressure differential and pulsation dampening control device for use in conjunction with a gas flow control valve in which gas flow through the valve is dependent upon inlet pressure to the valve being in excess of the control pressure provided by the control device, the device comprising a primary piston and cylinder assembly having one end of a primary cylinder adapted to be filled with hydraulic fluid and formed with a port for communicating with the control valve to supply the control pressure thereto, the other end of the primary cylinder having a further port for gas flow communication with the valve outlet so as to relate the control pressure proportionately to valve outlet pressure and control differential pressure as between the valve inlet and outlet, the primary piston being mechanically by a piston rod to a smaller diameter secondary piston in a secondary cylinder, the rod end of the secondary cylinder being ported to atmosphere and the other end of the secondary cylinder being adapted to be filled with hydraulic fluid and formed with another port for communication with a gas charge accumulator to provide pulsation dampening of the valve.

5. The invention of claim 4 wherein the gas flow valve is installed in a gas discharge line from a natural gas compressor to enable more accurate gas production measurements to be made, said control valve being an expansible resilient sleeve type in which control pressure from the control device is applied to the exterior of the sleeve in proportion to the gas pressure communicated with the other end of the primary cylinder for expanding said sleeve against gas pressure in the valve, said accumulator dampening movement of the secondary and primary pistons thereby dampening changes in the resilient sleeve in the control valve and reducing pulsations in the flow rate and pressure in the gas discharge line.

* * * * *